Sept. 10, 1940.    D. ANGLADA    2,214,546
ACETYLENE LAMP AND THE LIKE
Filed Dec. 7, 1938
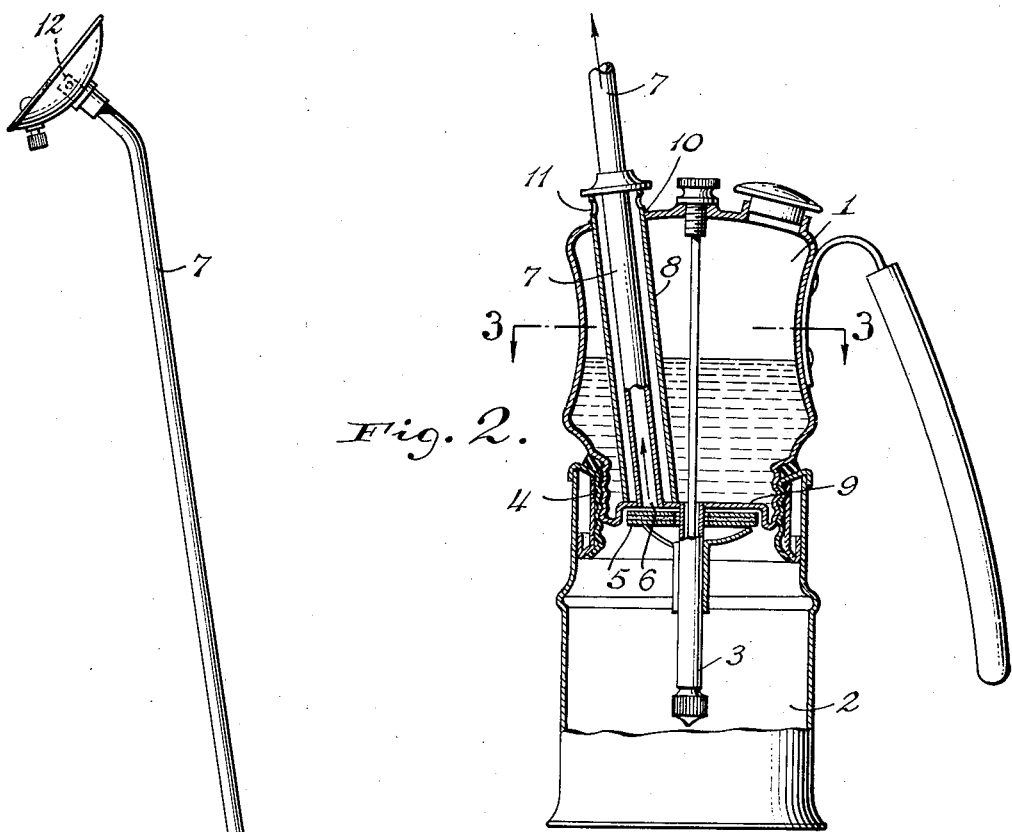
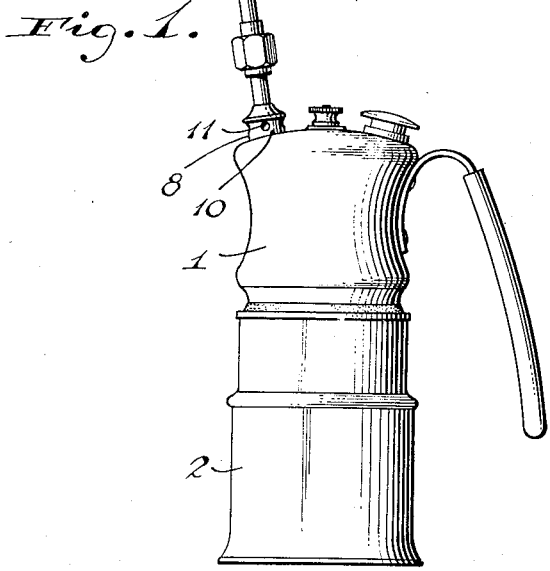
INVENTOR
DOMINGO ANGLADA
BY
ATTORNEYS Patented Sept. 10, 1940

2,214,546

UNITED STATES PATENT OFFICE 2,214,546

ACETYLENE LAMP AND THE LIKE

Domingo Anglada, New York, N. Y., assignor to Wolf Safety Lamp Company of America, Inc., Brooklyn, N. Y., a corporation of New York Application December 7, 1938, Serial No. 244,310

4 Claims. (Cl. 48—4)

This invention relates to acetylene lamps and other forms of lamps and devices in which acetylene gas is generated in a chamber from calcium carbide and subsequently is ignited and consumed.

Acetylene lamps have been used in mines and in and about railroads for many years and have been found to be objectionable in that the flame sputters at times, particularly after the lamp has been burning for a period of time. Sputtering has been an objectionable characteristic of acetylene lamps for many years and a drawback to their wider use.

It has been determined by me that such sputtering of the flame is primarily due to the presence of water, as vapor or drops, in the burner tube, which water is part of that fed from the water reservoir to the calcium carbide for the purpose of developing acetylene gas. It is of interest in this connection to note that some types of acetylene lamps burn effectively with their full candle power capacity for approximately two hours of the potential full eight hour life of the charge. After the old type of lamps have been burning for a few hours, the illuminating flame discolors from a bright white to a reddish color and therefore the light value or efficiency drops at least 30% of full capacity. I have found that the water in the reservoir of such old types of lamps becomes intensely hot, the heat spreading to the entire metal surface of the reservoir, all of which tends to keep the burner tube hot, resulting in the drop of candle power efficiency. I have also found that sputtering is due, in the old types of lamps, to water which enters the carbide chamber from the reservoir, vaporizing and entering the burner tube, interfering with the free flow of acetylene gas to the burner and interrupting the uniform flow of such gas to the burner tip.

The present construction as set forth in this application overcomes both the variance of the flame from white to a reddish color, sputtering of the flame at the burner tip, and also reduces the heat transmitted to the water chamber.

In the drawing, Fig. 1 is a side view of an acetylene lamp embodying this invention; Fig. 2 is a vertical section thereof somewhat enlarged, and Fig. 3 is a cross-section on the line 3—3 of Fig. 2.

The acetylene lamp comprises a water chamber 1 and a carbide chamber 2 adapted to hold calcium carbide. As usual in such lamps, water is fed through the valve 3 in small quantities from the water reservoir. The carbide chamber and the water reservoir are attachable and separable by reason of the interengagement of the screw threads 4. A suitable filter material arranged on the holder 5 covers the inlet 6 to the burner tube 7 and the burner tip 12. Within the reservoir and surrounding the burner tube 7 throughout its entire course in the reservoir I provide a condenser 8 which consists preferably of a cylindrical or tube-like length of Monel, brass or other metal, which has a greater diameter than the outside diameter of the burner tube 7 and is spaced therefrom. The condenser 8 is preferably soldered to the wall 9 which forms the bottom of the water reservoir 1 and extends through an opening 10 in the top wall of the water reservoir. In the specific embodiment shown in Fig. 2, the condenser is spaced from the vertical walls of the reservoir, permitting water to completely encircle the upright portion of the condenser 8. The condenser as shown in Fig. 2 extends a slight distance beyond the wall and is provided in such extension with a series of spaced apertures 11 (four such apertures will suffice).

This invention is illustrated in connection with an acetylene lamp which has a long extension or burner tube 7, which enables the user to illuminate distant areas which are to be inspected, particularly the wheels, axles and boxes of railroad cars. As far as known to me, this type of long neck burner tube, considerably longer than the height of the gas lamp, is entirely new in this industry and this invention is particularly useful in connection therewith. It may, however, be used in connection with other types of acetylene lamps and acetylene gas generators, including that type of acetylene lamp in which the burner tube passes through one of the side walls of the reservoir.

It has been found that this invention eliminates the objections heretofore set forth, both with respect to sputtering, change of light color, and abnormal amount of heat absorbed by the metal of the reservoir. This arrangement in effect insulates the burner tube. Although vapor is developed in the carbide chamber it is condensed when it reaches the lower portion of the acetylene tube in and about the inlet 6 and tends to return into the carbide chamber. The water vapor consequently does not enter the burner tube to such an extent or in such amounts as to interfere with the free flow of acetylene gas in the burner tube, nor does it mix with the acetylene gas and reduce its efficiency. Consequently the gas burns at substantially its full efficiency and sputtering is eliminated. The escape of air from within the condenser 8 is provided for by the apertures 11. It has also been found that the amount of heat transmitted to the water in the reservoir and to the metal of the reservoir is considerably reduced. The water in the reservoir does not heat up to as high temperature nor as quickly as in earlier existing lamps.

I claim:

1. In an acetylene lamp or like devices adapted to burn acetylene gas, a water reservoir, a carbide chamber, a burner tube having communication with the carbide chamber and passing through the reservoir, a partition around a portion of the burner tube completely separating and isolating such portion from that portion of the water reservoir which contains water, said partition being spaced from the burner tube to provide an air space, said air space having communication with the atmosphere.

2. In an acetylene lamp or like devices adapted to burn acetylene gas, a water reservoir, a carbide chamber, the water reservoir being adapted to hold a quantity of water, a valve adapted to control the feed of the water to the carbide chamber, a condenser within the water reservoir, said condenser comprising a wall extending from one wall of the reservoir to and through another wall thereof and spaced from the vertical walls of the reservoir, a burner tube having communication with the carbide chamber, the lower portion of said burner tube extending through said condenser and in spaced relation to the inner wall thereof providing an air space between the inner wall of the condenser and the outer wall of the portion of the burner tube within said condenser, said air space having communication with the atmosphere.

3. In a device of the character set forth in claim 2, in which a portion of the condenser extends beyond a wall of the reservoir and is provided in such extension with apertures leading into said space.

4. In a device of the character set forth in claim 2, in which the burner tube is considerably longer than the height of the body of the lamp.

DOMINGO ANGLADA.